(No Model.) 2 Sheets—Sheet 1.

H. O. KING.
Baling-Press.

No. 228,361. Patented June 1, 1880.

WITNESSES

INVENTOR
H. O. King
By H. J. Ennis
ATTORNEY

N. PETERS, PHOTO-LITHOGRAPHER, WASHINGTON, D. C.

(No Model.) 2 Sheets—Sheet 2.
H. O. KING.
Baling-Press.
No. 228,361. Patented June 1, 1880.

WITNESSES
F. Ourand
J. J. McCarthy

INVENTOR
H. O. King
By H. S. Ennis
ATTORNEY

UNITED STATES PATENT OFFICE.

HEZEKIAH O. KING, OF GREENVILLE, SOUTH CAROLINA.

BALING-PRESS.

SPECIFICATION forming part of Letters Patent No. 228,361, dated June 1, 1880.

Application filed May 8, 1880. (No model.)

*To all whom it may concern:*

Be it known that I, HEZEKIAH O. KING, a citizen of the United States, residing at Greenville, in the county of Greenville and State of South Carolina, have invented certain new and useful Improvements in Baling-Presses; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to certain improvements in presses for compressing cotton, hay, and other like materials; and it has for its object to provide an improved means for giving a gradual pressure to the material to be pressed, in order to compress the same into suitable bales for convenient transportation, as more fully hereinafter specified. This object I accomplish by the mechanism illustrated in the accompanying drawings, in which—

Figure 1:
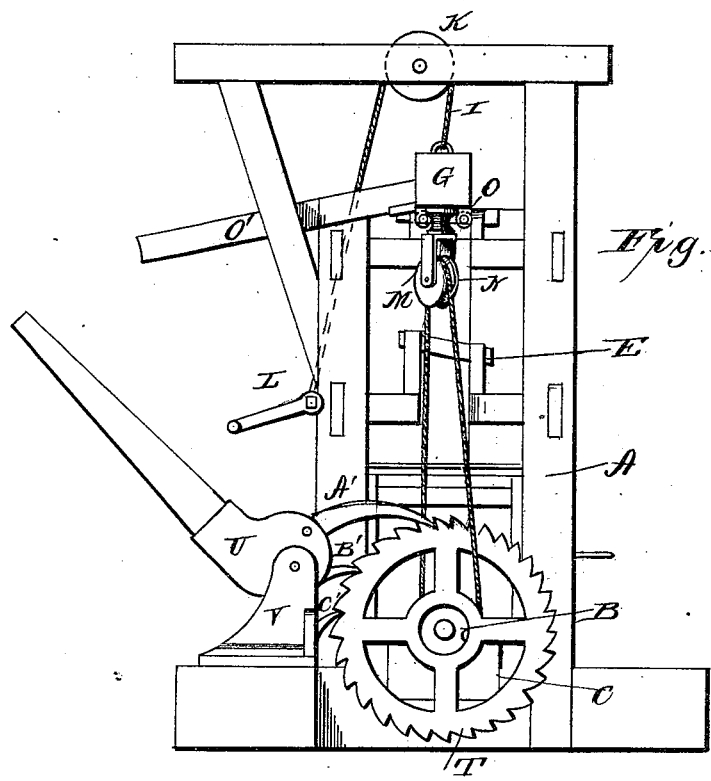
Figure 2:
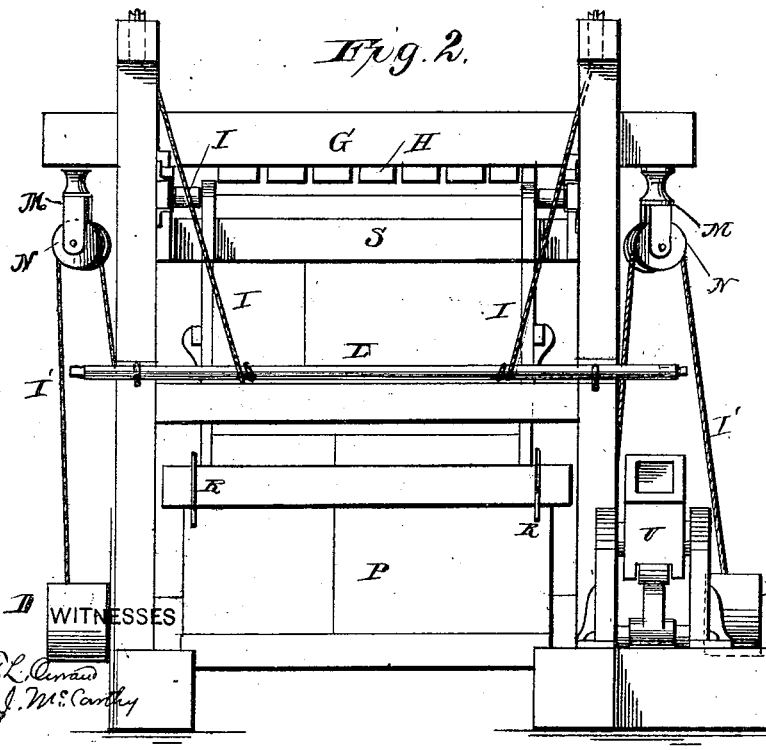
Figure 3:
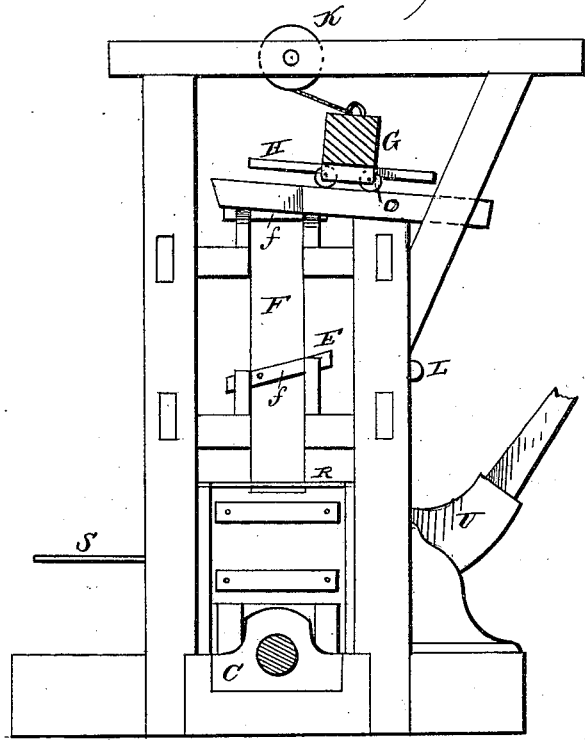
Figure 5:
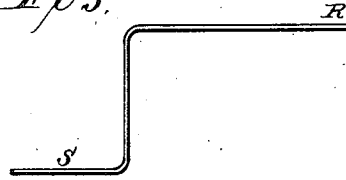
Figure 4:
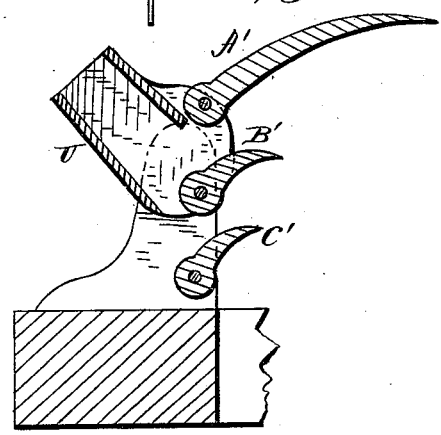

Figure 1 represents a side elevation, showing my improved press. Fig. 2 represents a front view of the press; Fig. 3, an elevation on the opposite side to that shown in Fig. 1; Fig. 4, a detached view of the pawl mechanism for operating the apparatus, and Fig. 5 a detached view of the clamp for securing the removable sides of the press together.

The letter A indicates the frame of the machine, carrying the working parts thereof, and B a transverse shaft journaled in bearings C, at opposite sides of the press. The said shaft is provided at each end with drums D, for the purpose hereinafter explained.

The letter E indicates a receiving and compressing chamber, into which the material to be compressed is fed in any suitable manner. Said chamber is rectangular in shape, and at each end is vertically slotted and provided with slides F, having inclined arms *f*, which support the slides by resting in suitable guides or sockets.

The letter G indicates a transverse beam, carrying at its under side a series of compressing-bars, H, and adapted to travel in the slots at each end of the compressing-chamber of the apparatus when the slides have been removed, it being understood that the slides are only in position during the filling of the press-chamber. The said beam is supported by means of chains, cords, or ropes I, at each end, passing over the pulleys K and journaled in the upper part of the frame of the machine, and connected to a shaft, L, which may be rotated by means of a crank or any other suitable mechanism, for the purpose of elevating said beam when desired.

At each end of the beam are secured the hangers M, in which are journaled the pulleys N, over which the cords, chains, or ropes I' are passed.

The beam G is provided with friction-rollers O, which are adapted to travel upon a removable inclined way, O'. When the beam G and its bars H, which form the platen, have been elevated after pressing one bale, the platen gravitates down the inclined way and allows the mouth of the press-chamber to be open for the reception of the next portion of material to form a bale.

The cords or chains at each end of the apparatus connect with the drums on the driving-shaft, so that when said shaft is rotated the cords or chains will be wound thereon to draw the transverse beam down upon the substance to be pressed in the compressing-chamber.

The letter P indicates two removable sides, forming part of the lower portion of the frame of the apparatus and constituting a chamber, into which the material is compressed. The object of these removable sides is to permit the compressed material to be removed after being formed into a bale. The said removable sides are held together, when required, by means of the clamp R. The said clamp is formed with a crank, S, at one end, by means of which it may be turned to release the removable sides when required to release the bale.

The letter T indicates a ratchet-wheel secured to the main shaft of the machine, and U a lever fulcrumed between standards V, attached to the bed of the machine. The said lever carries two pawls, A' and B', adapted to alternately engage the teeth of the ratchet-wheel as the lever is reciprocated in such manner as to rotate the main shaft in a forward direction and wind the rope or chain upon the drums, to bring the cross-beam and its compressing-bars H to bear upon the material to be compressed.

The letter C' indicates a pawl or dog, which engages the ratchet-wheel, and serves as a detent to hold it against backward pressure as the said ratchet is advanced by the pawls A' and B'.

The operation of my invention will be readily understood from the above description without further illustration.

Having thus fully described my invention, what I claim, and desire to secure by Letters Patent, is—

1. In a baling-press, the combination of the platen G H, having rollers O, with the inclined way O' and a slotted press-chamber, as shown and set forth.

2. The combination, in a baling-press, of the pivoted lever-socket U, alternate force-ratchets A' B', and stop-dog c' with the frame A, platen G H, inclined way O', and riding-rollers O, and with pulley-and-rope connections, substantially as and for the purposes specified.

In testimony whereof I affix my signature in presence of two witnesses.

H. O. KING.

Witnesses:
H. J. ENNIS,
E. H. BRADFORD.